United States Patent
Martin et al.

(10) Patent No.: US 9,576,246 B2
(45) Date of Patent: Feb. 21, 2017

(54) PREDICTIVE MODELING AND DATA ANALYSIS IN A SECURE SHARED SYSTEM

(71) Applicant: BigML, Inc., Corvallis, OR (US)

(72) Inventors: Francisco J. Martin, Corvallis, OR (US); Oscar Rovira, Corvallis, OR (US); Jos Verwoerd, Corvallis, OR (US); Poul Petersen, Corvallis, OR (US); Charles Parker, Corvallis, OR (US); Jose Antonio Ortega, Corvallis, OR (US); Beatriz Garcia, Corvallis, OR (US); J. Justin Donaldson, Corvallis, OR (US); Antonio Blasco, Corvallis, OR (US); Adam Ashenfelter, Corvallis, OR (US)

(73) Assignee: BIGML, INC., Corvallis, OR (US)

( * ) Notice: Subject to any disclaimer, the term of this patent is extended or adjusted under 35 U.S.C. 154(b) by 333 days.

(21) Appl. No.: 14/025,063

(22) Filed: Sep. 12, 2013

(65) Prior Publication Data
US 2014/0101076 A1    Apr. 10, 2014

Related U.S. Application Data

(60) Provisional application No. 61/710,175, filed on Oct. 5, 2012.

(51) Int. Cl.
*G06N 99/00* (2010.01)
*G06F 21/60* (2013.01)
*G06F 21/62* (2013.01)

(52) U.S. Cl.
CPC .......... *G06N 99/005* (2013.01); *G06F 21/604* (2013.01); *G06F 21/6245* (2013.01); *G06F 2221/2113* (2013.01)

(58) Field of Classification Search
None
See application file for complete search history.

(56) References Cited

U.S. PATENT DOCUMENTS

| | | | |
|---|---|---|---|
| 6,278,464 B1 | 8/2001 | Kohavi | |
| 6,301,579 B1 | 10/2001 | Becker | |
| 6,496,208 B1 | 12/2002 | Bernhardt | |
| 6,519,599 B1 | 2/2003 | Chickering | |
| 7,386,835 B1 | 6/2008 | Desai | |
| 7,735,051 B2 * | 6/2010 | Van Huben | G06F 17/30575 716/104 |
| 8,229,917 B1 | 7/2012 | Aneas | |

(Continued)

OTHER PUBLICATIONS

Zhang, Q., et al. "Cloud computing: state-of-the-art and research challenges." Journal of internet services and applications 1.1 (2010): 7-18.*

(Continued)

*Primary Examiner* — Kakali Chaki
*Assistant Examiner* — Eric Nilsson
(74) *Attorney, Agent, or Firm* — Schwabe, Williamson & Wyatt P.C.

(57) ABSTRACT

A system and method enables users to selectively expose and optionally monetize their data resources, for example on a web site. Data assets such as datasets and models can be exposed by the proprietor on a public gallery for use by others. Fees may be charged, for example, per new model, or per prediction using a model. Users may selectively expose public datasets or public models while keeping their raw data private.

26 Claims, 14 Drawing Sheets

(56) References Cited

U.S. PATENT DOCUMENTS

| | | | |
|---|---|---|---|
| 8,364,613 B1* | 1/2013 | Lin .................. | G06N 7/005 700/65 |
| 9,098,326 B1 | 8/2015 | Martin | |
| 2001/0054032 A1 | 12/2001 | Goldman | |
| 2004/0162814 A1 | 8/2004 | Bergholz | |
| 2005/0049986 A1 | 3/2005 | Bollacker | |
| 2005/0097070 A1 | 5/2005 | Enis | |
| 2006/0242090 A1 | 10/2006 | Matsuda | |
| 2006/0288031 A1 | 12/2006 | Lee | |
| 2006/0294058 A1 | 12/2006 | Zabback et al. | |
| 2007/0094060 A1 | 4/2007 | Apps | |
| 2007/0179966 A1 | 8/2007 | Li | |
| 2007/0208497 A1 | 9/2007 | Downs | |
| 2007/0282774 A1 | 12/2007 | Bouzas et al. | |
| 2008/0168011 A1 | 7/2008 | Steinberg | |
| 2008/0307369 A1 | 12/2008 | Liu | |
| 2009/0013216 A1 | 1/2009 | Abrashkevich | |
| 2009/0063389 A1 | 3/2009 | Crawford | |
| 2009/0064053 A1 | 3/2009 | Crawford | |
| 2009/0178019 A1* | 7/2009 | Bahrs .................. | G06F 21/62 717/104 |
| 2009/0198725 A1 | 8/2009 | Lee | |
| 2009/0313208 A1 | 12/2009 | Helfman | |
| 2011/0184884 A1 | 7/2011 | Lyons et al. | |
| 2011/0316856 A1 | 12/2011 | Poston et al. | |
| 2012/0166156 A1* | 6/2012 | Meng .................. | G06F 17/18 703/2 |
| 2012/0240064 A1 | 9/2012 | Ramsay | |
| 2012/0310785 A1* | 12/2012 | Poulin .................. | G06Q 10/04 705/27.1 |
| 2012/0323824 A1 | 12/2012 | Gansner | |
| 2013/0031041 A1 | 1/2013 | Maciejewski | |
| 2013/0117280 A1 | 5/2013 | Donaldson | |
| 2015/0019569 A1 | 1/2015 | Parker | |
| 2015/0081685 A1 | 3/2015 | Ashenfelter | |

OTHER PUBLICATIONS

Red Lion Data. <www.RedLionData.com>. <Jan. 8, 2012>. <retrieved Mar. 30, 2016>.*

Zhang, Q. et al; "Cloud computing: state of the art and research challenges"; Journal of Internet services and applications 1.1; (2010) pp. 7-18.

"Data Model"; Computer Desktop Encyclopedia; The Computer Language Company; retrieved on Jan. 29, 2015 from <http://lookup.computerlanguage.com/host_app/search?cid=C999999&term=data+model&lookup.x=0&lookup.y=0.

Stasko et al.; "An Evaluation of Space-Filing Information Visualizations for Depicting Hierarchical Structures"; International Journal of Human-Computer Studies; vol. 53, iss 5; Nov. 2000; pp. 663-694.

Haim et al. "A Streaming Parallel Decision Tree Algorithm," Journal of Machine Learning Research 11 (2010) 849-872, Feb. 2010; 24 pages.

Daniel D. Corkill, "Blackboard Systems"; Blackboard Technology Group, Inc.; Al Expert 6(9): 40-47, Sep. 1991; 19 pages.

Panda et al. "PLANET: Massively Parallel Learning of Tree Ensembles with MapReduce," Proceedings of the 35th International Conference on Very Large Data Bases (VLDB-2009); 12 pages.

Ned Horning: "Introduction to decision trees and random forests", Mar. 19, 2011, pp. 1-14, (http://ebookbrowse.com/decisiontrees-randomforest-v2-pdf-d82430890 [retrieved on Feb. 13, 2013] pp. 2, 3, 7.

Stef Van Den Elzen et al: "BaobabView: Interactive Construction and Analysis of Decision Trees", Visual Analytics Science and Technology (VAST), 2011 IEEE Conference on, IEEE, Oct. 23, 2011, 10 pages.

J.R. Quinlan: "Simplifying decision trees", International Journal of Man-Machine Studies, vol. 27, No. 3, Sep. 1987; 14 pages.

Tyree et al: "Parallel Boosted Regression Trees for Web Search Ranking", WWW 2011, Mar. 28-Apr. 1, 2011, Hyderabad, India; 10 pages.

Schwabe, Williamson & Wyatt, Portland, Oregon; Related Case Listing; Dec. 22, 2015, 1 page.

Microsoft; "About Tooltip Controls"; Windows Dev. Center; Sep. 25, 2011; retrieved from Internet Archive WayBack Machine on Jul. 22, 2015: https://web.archive.org/web/20110925963821/http://msdn.microsoft.com/en-us/library/windows/desktop/bb760250(v=vs.85)/aspx.

International Search Report for PCT/US12/063300; Mailing Date: Mar. 8, 2013; 3 pages.

* cited by examiner

PREDICTIVE MODELING AND DATA ANALYSIS IN A SECURE SHARED SYSTEM

RELATED APPLICATIONS

This application is a non-provisional of U.S. Provisional Application No. 61/710,175 filed Oct. 5, 2012 which is incorporated herein by this reference.

Copyright Notice

©2012-2013 BigML, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

This invention pertains to computer-implemented methods and apparatus for machine learning or modeling digital datasets, and utilizing data models to make predictions about new data in a secure, private or shared system.

BACKGROUND OF THE INVENTION

Machine Learning uses a number of statistical methods and techniques to create predictive models for classification, regression, clustering, manifold learning, density estimation and many other tasks. A machine-learned model summarizes the statistical relationships found in raw data and is capable of generalizing them to make predictions for new data points. Machine-learned models have been and are used for an extraordinarily wide variety of problems in science, engineering, banking, finance, marketing, and many other disciplines. Uses are truly limited only by the availability and quality of datasets. Building a model on a large dataset can take a long time. Further, the time and resources necessary to build a model increases as the required quality or depth of the model increases. In view of these investments, some models are valuable to other users. Datasets themselves also may have value in view of the investment to acquire, check or scrub, and store the dataset. In fact, many interesting datasets are built after laborious processes that merge and clean multiple sources of data. Often datasets are based on proprietary or private data that owners do not want to share in their raw format.

SUMMARY OF PREFERRED EMBODIMENTS

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

In one aspect, a system in accordance with the present disclosure may enable an owner of a dataset to control permissions that would enable another party or second user to use the dataset to make a new model derived from the dataset. The owner or the system may charge the second user a fee to use the dataset. The fee may be shared with the owner.

In another aspect, a system in accordance with the present disclosure may enable an owner of a model to control permissions that would enable another party or second user to use the model to make a predictions based on a new input dataset provided by the second user. The owner or the system may charge the second user a fee to use the model. The fee may be shared with the owner of the model. The model may be, for example, a decision tree model.

According to another aspect, a dataset or a model may be displayed or advertised in a public gallery. The display may contain a summary, thumbnail or metadata describing the dataset or the model, as the case may be.

According to yet another aspect, a model may be published to a public gallery in a black-box form that enables use of the model to make predictions without disclosing its internal operation. In another aspect, a model may be published to a public gallery in a white-box form that enables use of the model to make predictions and also discloses a descriptive and actionable version of the model. The actionable version enables the user to understand operation and if desired modify the model. Different fees may be charged for black-box and white-box models. Fees may be flat rate, per prediction, or based on other criteria.

Additional aspects and advantages of this invention will be apparent from the following detailed description of preferred embodiments, which proceeds with reference to the accompanying drawings. The invention is not intended to be limited by the drawings. Rather, the drawings merely illustrate examples of some embodiments of some aspects of this disclosure.

Some portions of the detailed descriptions which follow are presented in terms of procedures, logic blocks, processing, steps, and other symbolic representations of operations on data bits within a computer memory. These descriptions and representations are the means used by those skilled in the data processing arts to most effectively convey the substance of their work to others skilled in the art. A procedure, logic block, process, etc., is generally conceived to be a self-consistent sequence of steps or instructions leading to a desired result. The steps require physical manipulations of physical quantities. Usually, though not necessarily, these quantities take the form of electrical or magnetic signals capable of being stored, transferred, combined, compared and otherwise manipulated in a computer system.

In short, the invention is intended to be implemented in software; i.e., in one or more computer programs, routines, functions or the like. Thus it may best be utilized on a machine such as a computer or other device that has at least one processor and access to memory, as further described later. In a preferred embodiment, a system is hosted on a server to provide the features described herein to remote users. The server may comprise one or more processors. The server may be remotely hosted "in the cloud." Accordingly, in this description, we will sometimes use terms like "component," "subsystem," "model server," "prediction server," or the like, each of which preferably would be implemented in software.

It should be born in mind that all of the above and similar terms are to be associated with the appropriate physical quantities they represent and are merely convenient labels applied to these quantities. Unless specifically stated otherwise as apparent from the following discussions, it is appreciated that throughout the present invention, discussions utilizing terms such as 'processing,' computing, 'calculating,' 'determining,' 'displaying' or the like, refer to the action and processes of a computer system, or any other digital electronic computing device having a processor, that manipulates and transforms data represented as physical (electronic) quantities within the system's registers and memories into other data similarly represented as physical quantities within the system memories or registers or other such information storage, transmission or display devices. The term processor encompasses multiple processors acting in concert. A system may be located in one or more physical locations, e.g. distributed or housed "in the cloud" (a centralized location where plural processors and related equipment may be housed and remotely accessed). Further, we use the term "user" in a broad sense relative to a processor or other computing platform, program or service. A user may be a natural person or another processor or other computing platform, program or service. For example, an API may be used to enable another machine or processor to utilize a system of the type described herein.

Note that the invention can take the form of an entirely hardware embodiment, an entirely software/firmware embodiment or an embodiment containing both hardware and software/firmware elements. In a preferred embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

DETAILED DESCRIPTION OF PREFERRED EMBODIMENTS

Figure 1:
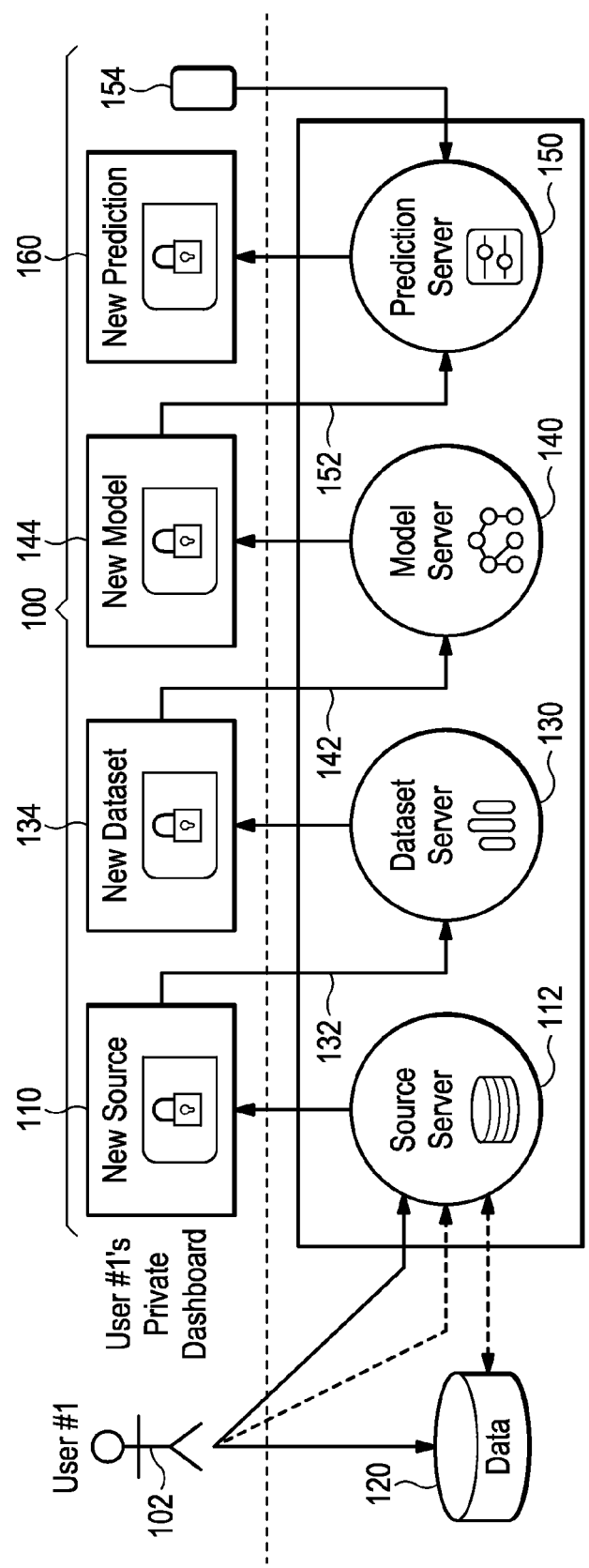
FIG. 1 is a simplified process and system hybrid diagram, illustrating one example of an implementation consistent with the present disclosure, in which a first user interacts with a system to create a new data source, a new dataset derived from the data source, a new model of the dataset, and a new prediction that utilizes the model of the dataset.

FIG. 1 is a simplified process and system hybrid diagram, illustrating one example of an implementation consistent with the present disclosure. In the figure, a user #1 (reference 102) has access to her own private workspace or "dashboard" 100. In a preferred embodiment, a user may interact with the system using a website. Programs, data, etc, in the user #1 dashboard 100 are not visible to other users. Users may be registered with the system, and may have login names, and passwords, or utilize other known security measures. A registered user 102 can create a new data source 110 by uploading local data or using a URL that a source server 112 may use to retrieve the data. The data may be stored in a data store accessible to the user 102 and to the source server 112. In one example, the user may provide access credentials to enable the source server to access selected data stored at 120. A data source or source is the raw data that that is used to create a predictive model. A dataset can be a single dataset or a set of datasets. A dataset can be created using a number of transformations over one or more datasets.

A source is usually a (large) file, and may be in a comma-separated values (CSV) format, although many other formats may be used. Each column in the data file may represent a feature or field. A column, often the last column, usually represents the class or objective field. The file might have a first row named header with a name for each field.

A registered user 102 may transform her new source data 110 into a dataset 134 as follows. An illustrative system further includes a dataset server 130. The new data source 110 may provide raw data to the dataset server 130 as indicated by arrow 132. A dataset may comprise a binary and structured version of a source where each field has been processed and serialized according to its type. A field may be numeric, categorical, a date, time, or text. Other field types may be created. In an embodiment, for each field, descriptive statistics including histograms that depict the distribution may be computed automatically, depending on the type of the field. In general the new dataset 134 is derived from the data source 110. Note the new dataset 134 is associated with user 102's private dashboard 100 so that the dataset is accessible to user 102 but not available to anyone else at this juncture.

The user 102 may transform the new dataset 134 into a model. A model is a structured representation of the dataset with predictive power. A model may be created using a subset of fields of the dataset as input fields, and another subset of the dataset fields as objective fields (the ones that the user wants the model to predict). A model can be a single model or an ensemble of models. An ensemble can be created using the same or different datasets or techniques. Details of methods for creating models are known. In the illustration of FIG. 1, the dataset 134 is provided to a model server 140 as indicated by arrow 142. The model server creates a new model 144 based on the dataset and selected parameters. For example, a model may use all the instances in the dataset to build the model, or just a subset as specified by the user through a number of sampling options.

Datasets and models may be enriched with various types of metadata, for example:

Descriptive metadata about the origin or purpose of the data like descriptions, tags, categories, or pictures.

Technical metadata. For example, number of rows, number of fields, types of fields, type of algorithm, parameters of the algorithm.

Privacy metadata that defines who is authorized to get access, under what conditions and what restrictions apply.

Note in the present example the new model 144 is associated with user 102's private dashboard 100 so that the model is accessible to user 102 but not available to anyone else at this juncture. The model can be used to make predictions on new input data that were not used to build the model. The model uses the new input data to predict values of the objective fields. Some examples are described later.

The user 102 may make predictions using a prediction server 150. The model 144 is accessible to the prediction server 150 as indicated by arrow 152. Further, the user provides new input data 154 to the prediction server for the purpose of predicting objective field values, based on applying the model to that new input data. The results form a new prediction 160. Note again that the model, the new input data, and the new prediction 160 are all associated exclusively to the user 102 secure dashboard 100. In an embodiment, each registered user may have a number of sources, datasets, models, and predictions that are kept private in her dashboard. In some embodiments, interactions between a user and the system can be done through a user interface or programmatically through an API.

Figure 2:
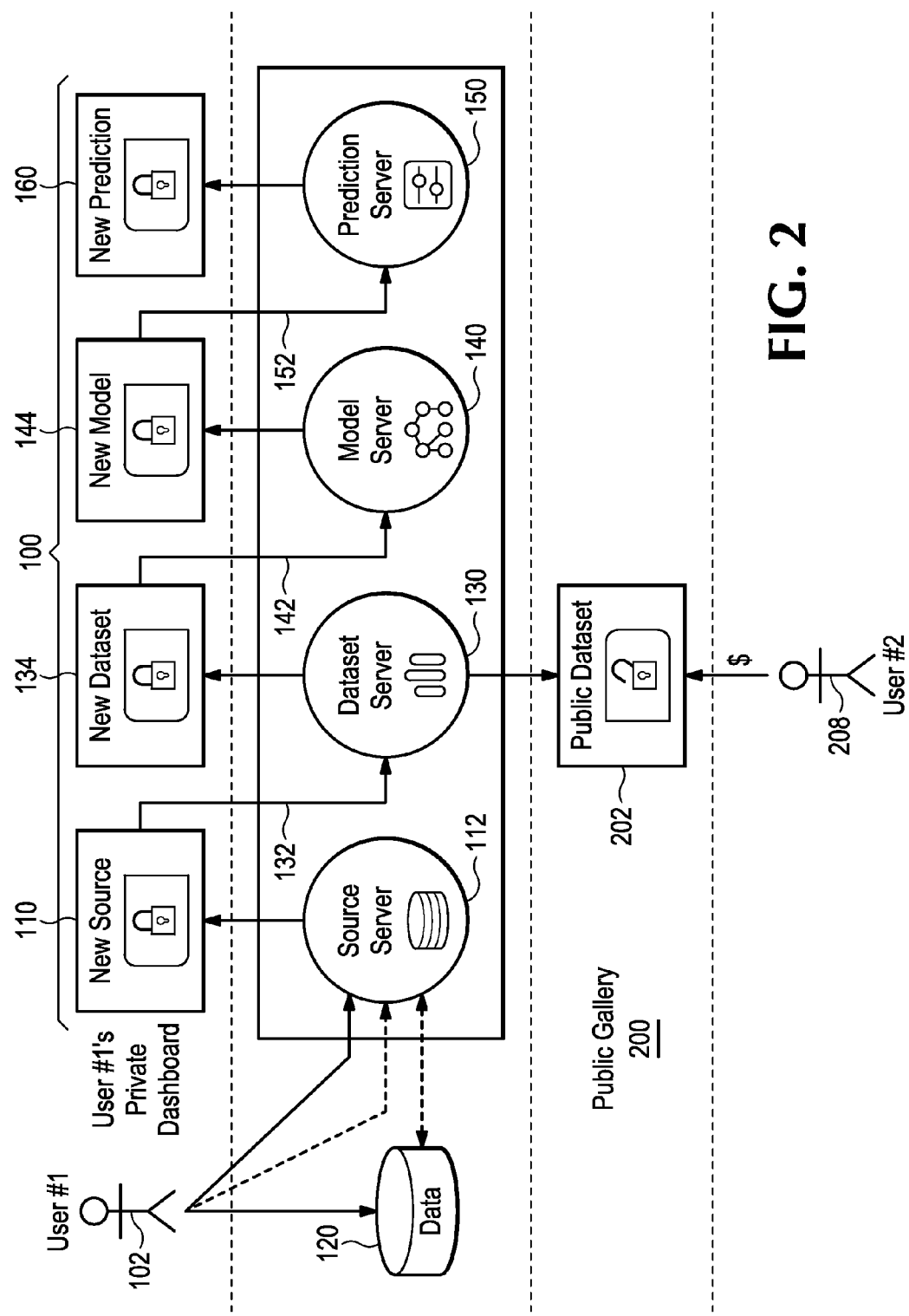
FIG. 2 shows the diagram of FIG. 1 amended to illustrate the first user publishing the dataset to a public gallery.

A user 102 may make her dataset 134 public. Referring now to FIG. 2, it shows a public gallery 200. The public gallery may be implemented, for example, as a webpage on a website. Examples are shown below. Once a data set is made public, other users can have access to the summary statistics for each individual field in the data set, but cannot have access to the raw data that was used to build the data set. In some embodiments, the system can be exposed to the general public via a public gallery where heterogeneous users can exchange datasets and/or models. In some embodiments, the system may be accessible only to the members or a selected subset of members of the same organization. If the data set is free or once a user has paid the requested fee, the data set can be used within the system by that paying user (208) to create new models.

Preferably, unique identifiers are assigned to each resource in the system. For example, unique identifiers may be assigned to each source, dataset, model, ensemble, prediction, and evaluation. By way of illustration, identifiers may look like this:

source/5202c67b035d072c00006974
dataset/5202ce99035d072bf9002476
model/521e8c01035d0750c6000a2a
ensemble/521e8ce1035d0750c6000a3f
prediction/521e8b05035d0750cd00079d
evaluation/521e8d3e035d0750c6000a46

Any identifiers that are at least unique within the system may be used. In use, for example, a software call to create a new model may include an identifier of the specific dataset to be used to create the new model. Resource identifiers can be used by users to refer to various assets in their private dashboards or in a public gallery.

Referring again FIG. 2, a data set 202 has been made public by its owner, here user 102, and placed in the public gallery 200. The dataset may be placed in the public gallery by the dataset server 130. A second user 208 (or any user) now has access to the public data set 202. The owner, in this example user 102, can decide whether other users can have access to the data set for free or need to pay a fee before using the data set. Such fees may be collected, for example in the context of a web site, by way of bank transfers, credit cards, payment services such as PayPal, etc.

Figure 3:
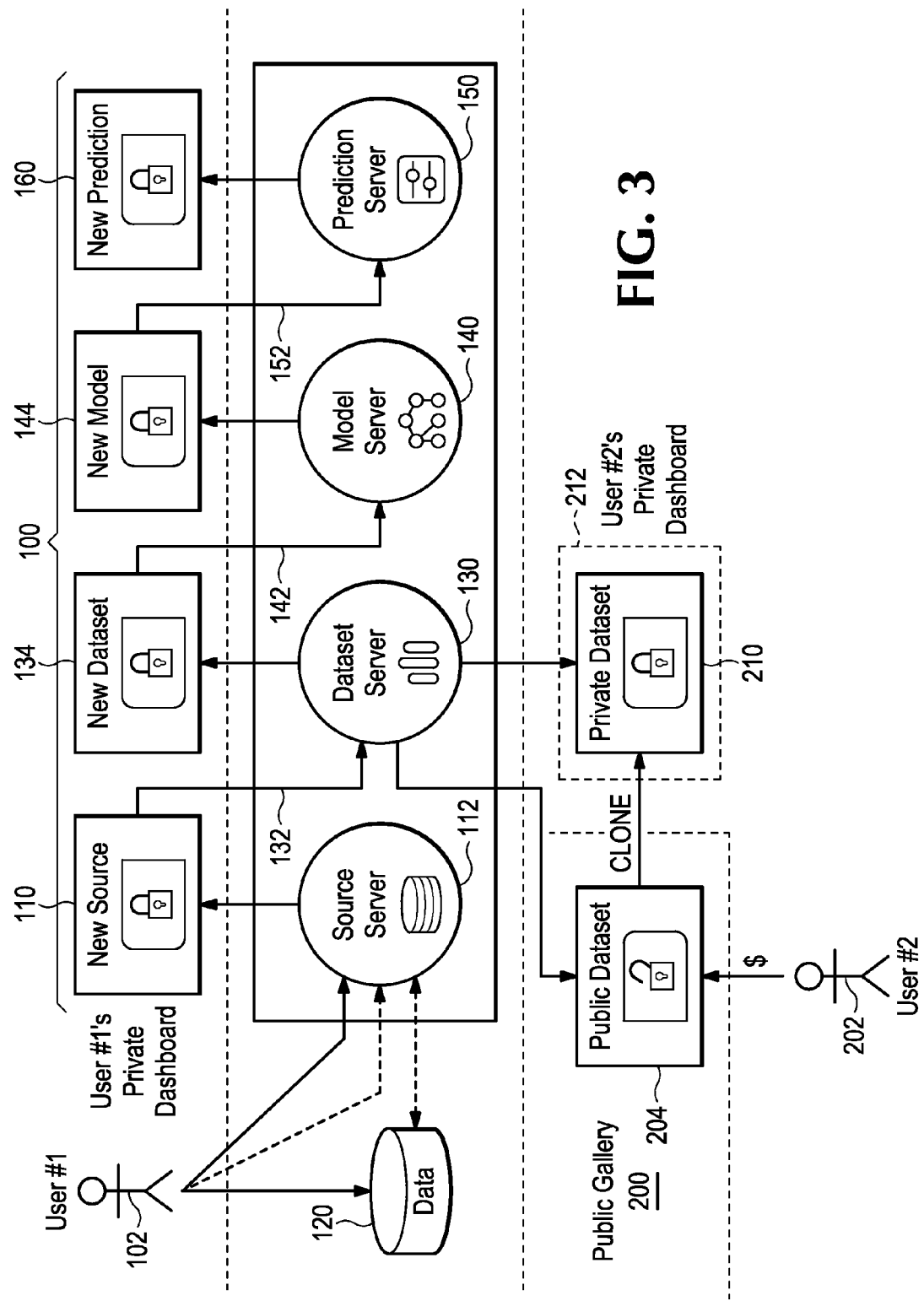
FIG. 3 shows the diagram of FIG. 2 amended to illustrate a second user acquiring the dataset, and the dataset cloned and copied to the second user's workspace or "dashboard."
Figure 4:
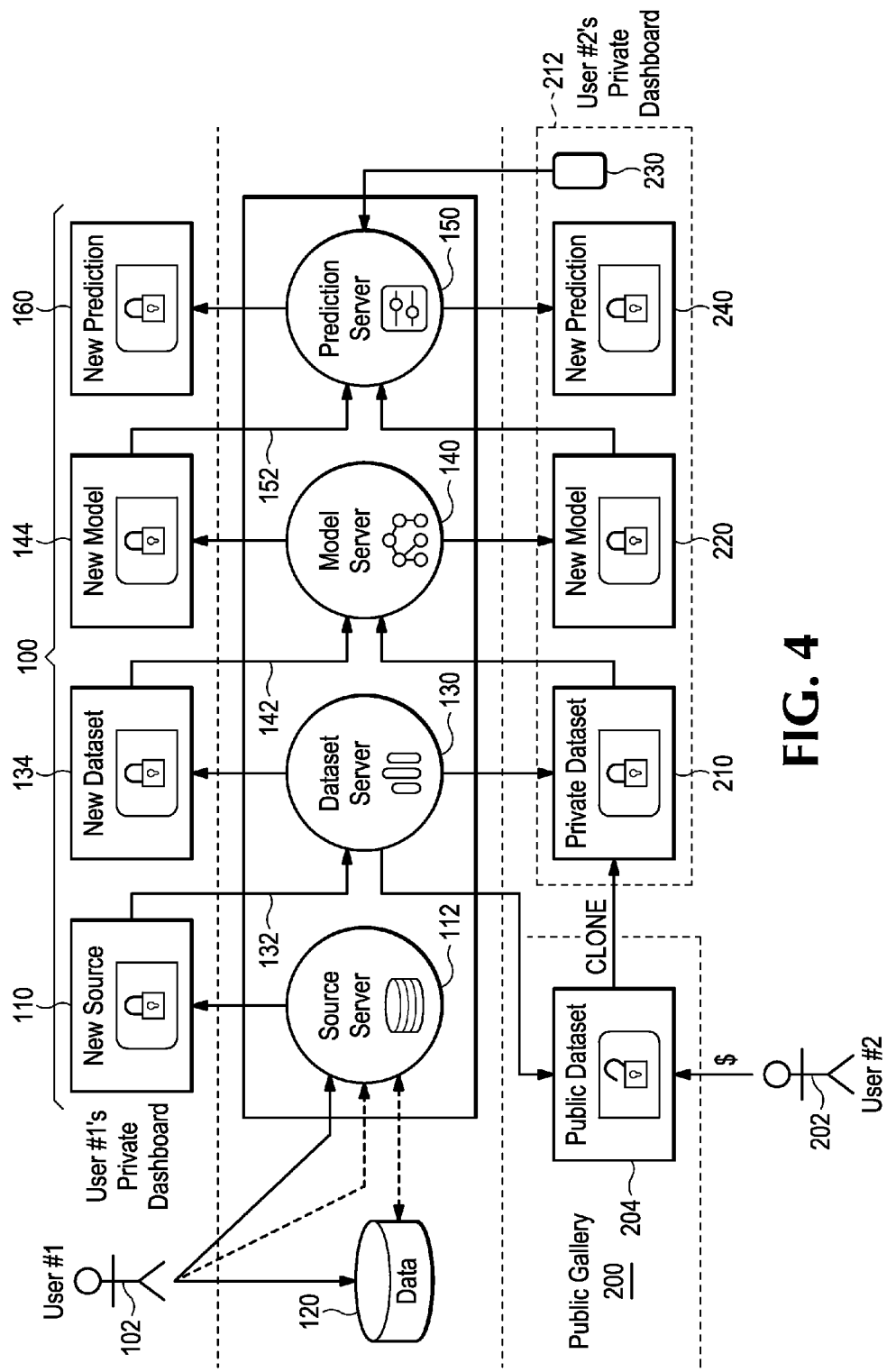
FIG. 4 shows the diagram of FIG. 3 amended to illustrate the second user utilizing the acquired clone dataset in the second user's private dashboard.

Referring now to FIG. 3, this figure illustrates a data set, namely public data set 204, placed in the public gallery 200 by the data set server 130. A second user 202 pays consideration to access or purchase the data set 204. In this case, the data set is cloned to create a new private data set 210. Private data set 210 is placed in user 202's private dashboard 212. The private dataset can be used by user 202 to create a new model using the model server 140. FIG. 4 illustrates this scenario, in which the user 202 as acquired the private data set 210. User 202 then utilizes the model server 140 to create a new model of her private data set 210. The new model 220 is stored in the second user's private dashboard 212. Further, in FIG. 4, the second user 202 may apply the new model 222 the prediction server 150 in order to create a new prediction 240. The new prediction may be based on new input data 230, provided by the user 202 to the prediction server.

Evaluations provide a convenient way to measure the performance of a predictive model. A user can evaluate a model using a dataset of her own. In some embodiments, the server may provide various performance metrics that provide an estimate of how well a given model predicts an outcome as compared to its performance faced with data similar to the dataset tested.

In an embodiment, a user also can make a model public that she has built using a system of the type illustrated herein. A model may be uploaded, for example, into a user's private dashboard from an external source. Or, the user may choose to make public a model that she created using the system, as describe above (new model 144). Once a model is made public, other users may have access to a thumbnail picture, for example, that represents the model, and or other meta information about the model. Meta data may include, for example, the number of fields and number of instances of the dataset used to build the model.

The owner of a model can control whether other users can have access to the internal structure of the model, for example using a selected one of at least two methods: black-box or white-box. If the owner selects a black box method, other users will not be able to see how the model works internally, but they will still be able to use the model to make predictions using their own input data. If the owner uses the white box method, other users will have access to a descriptive and actionable version of the model that explains how it works, in addition to the ability to make predictions as conferred by black-box models. For example, an actionable version of a model may be provided in various formats. These may include JSON, PMML, Microsoft Excel, a sequence of if—then rules and various programming languages such as Python, Ruby, Java, etc.

Figure 5:
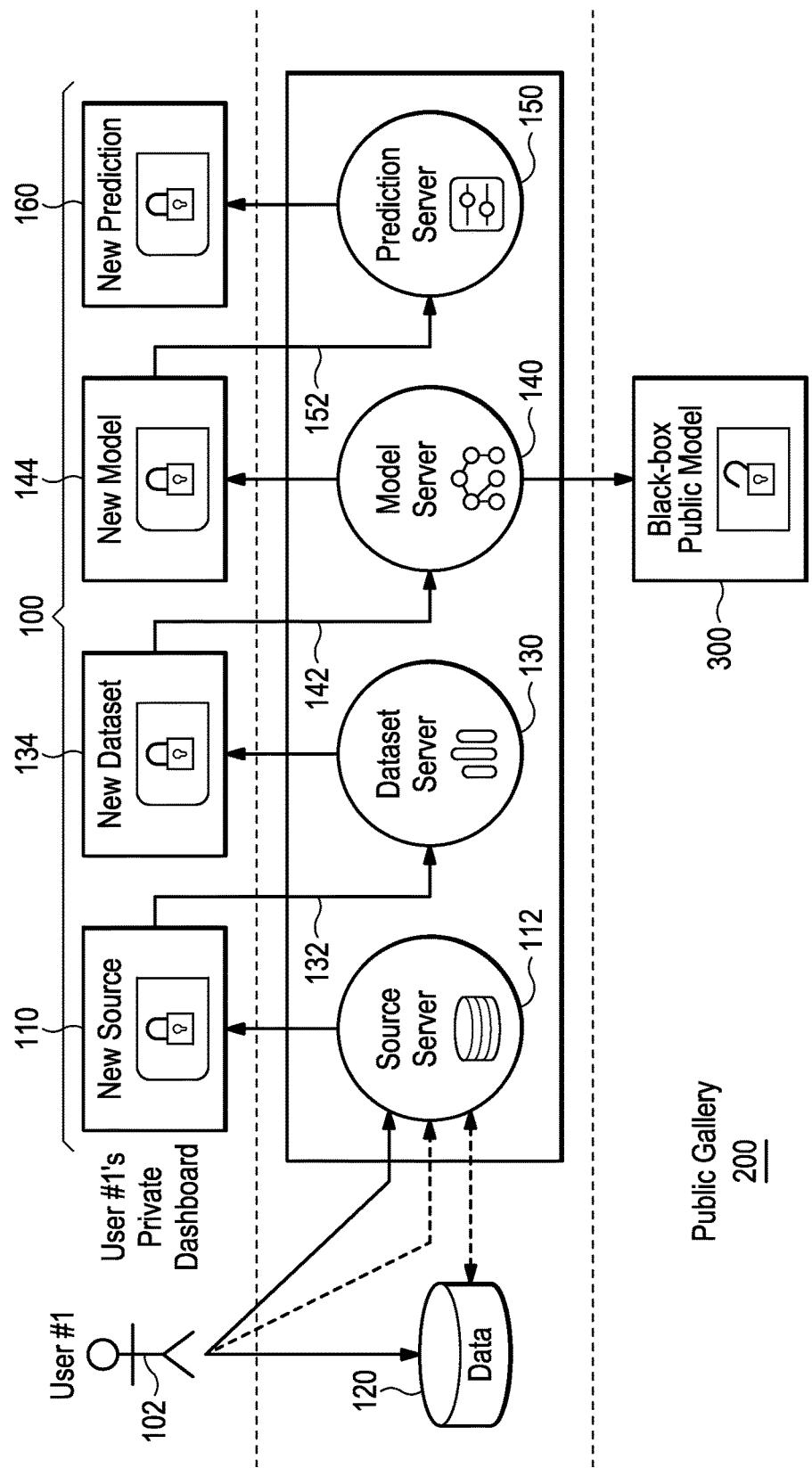
FIG. 5 shows the diagram of FIG. 1 amended to illustrate User #1 utilizing the system to make a model public in a black-box way.

FIG. 5 illustrates a scenario in which the owner as has published a black-box public model 300 into a public gallery 200. As shown, the model 300 may be placed in the public gallery by the model server 140. The gallery display may include information about the model such as the number of fields and instances in the dataset.

Figure 6:
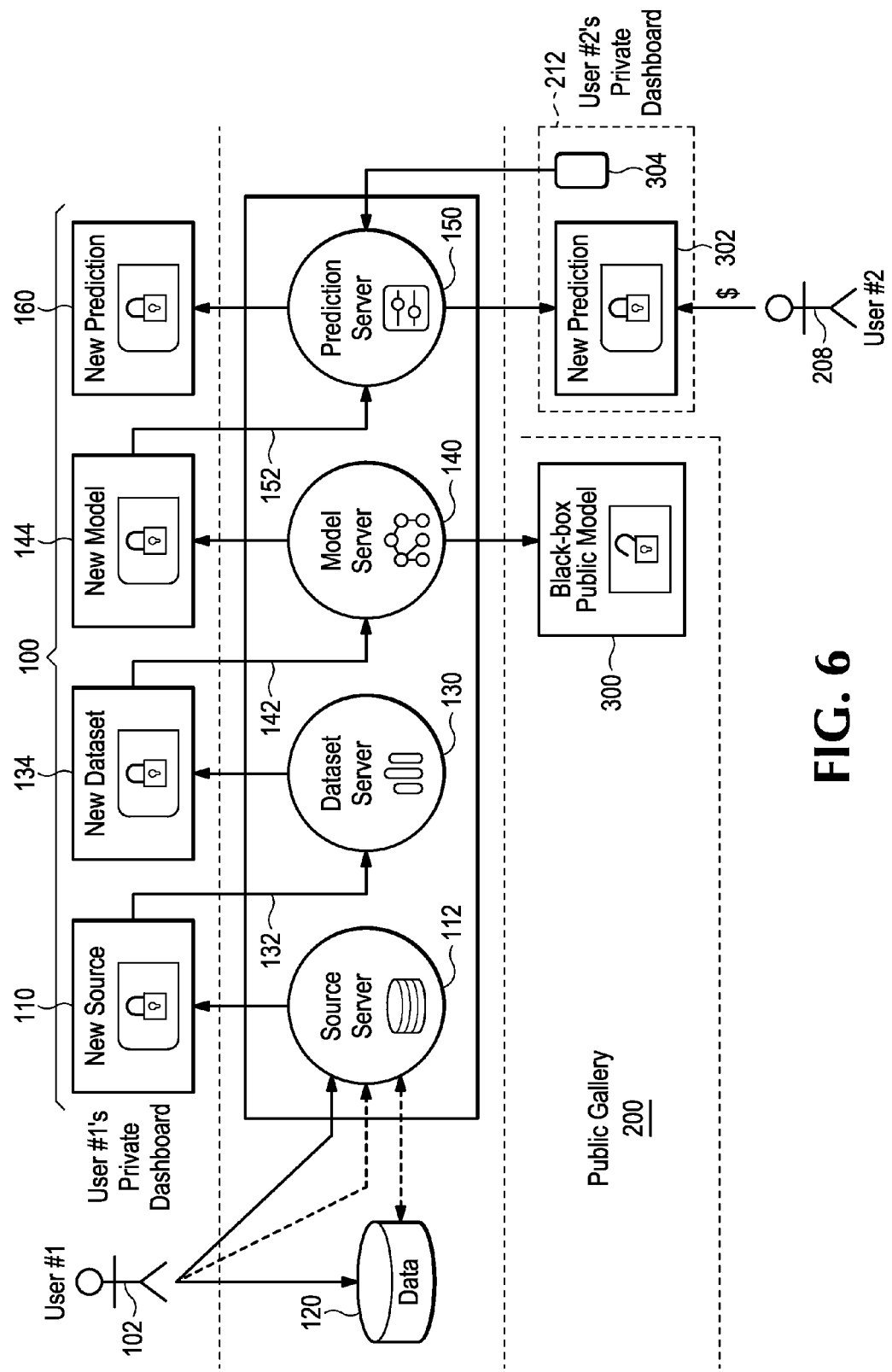
FIG. 6 shows the diagram of FIG. 5 amended to illustrate a second User #2 utilizing the User #1 black-box model to make predictions in the user #2 private dashboard.

FIG. 6 illustrates the use of the black-box public model 300 by a user 208. In this illustration, the user 208 a pays consideration requested for use of the model, and then uses the black-box model 300 and the prediction server 150 in order to create a new prediction 302. The new prediction may be based on new input data 304 provided by user 208. The new prediction 302 is proprietary to the user 208 and thus is placed in the user's private dashboard 212.

Figure 7:
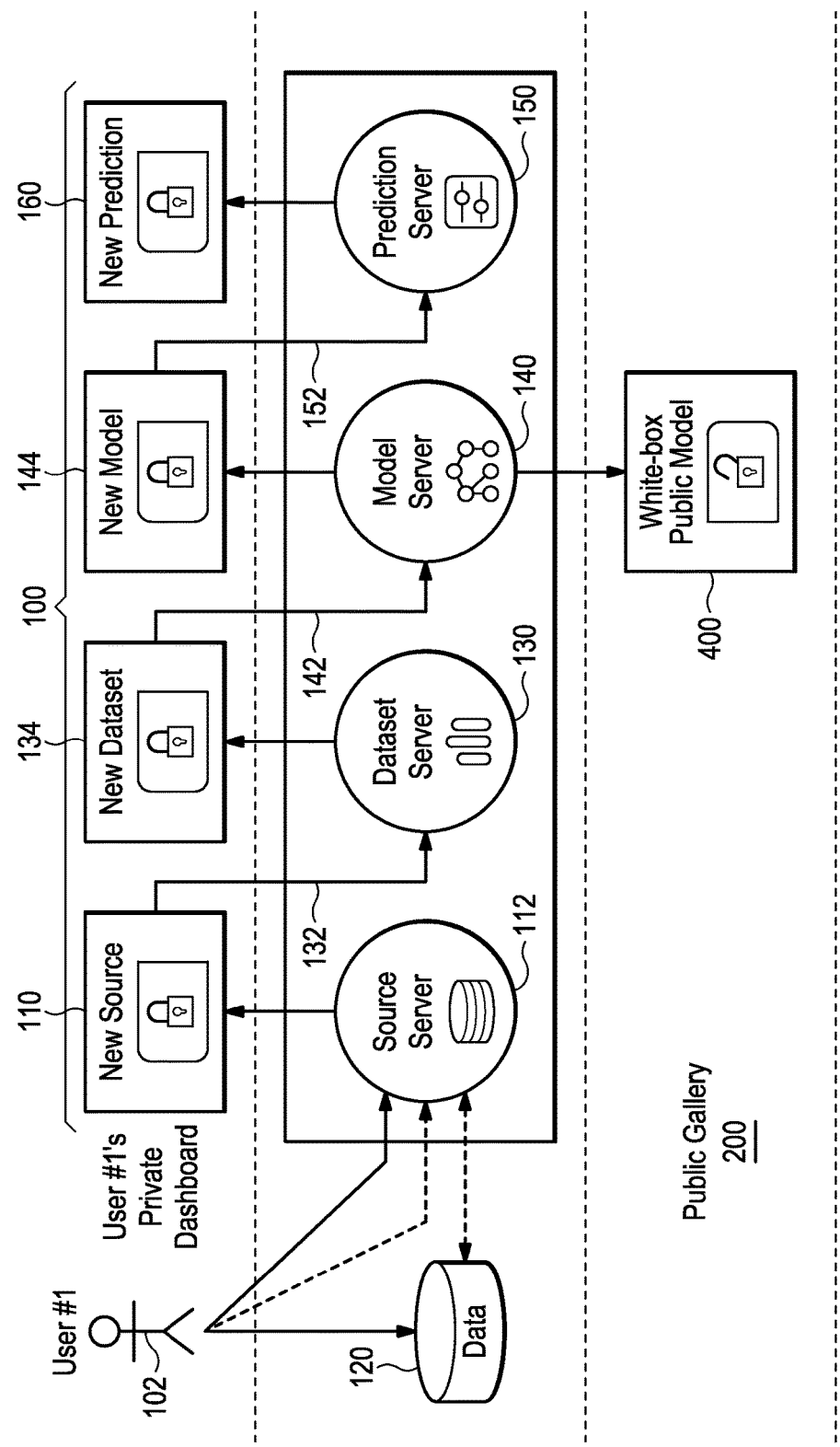
FIG. 7 shows the diagram of FIG. 1 amended to illustrate the first user publishing a white-box type of model to the public gallery.
Figure 8:
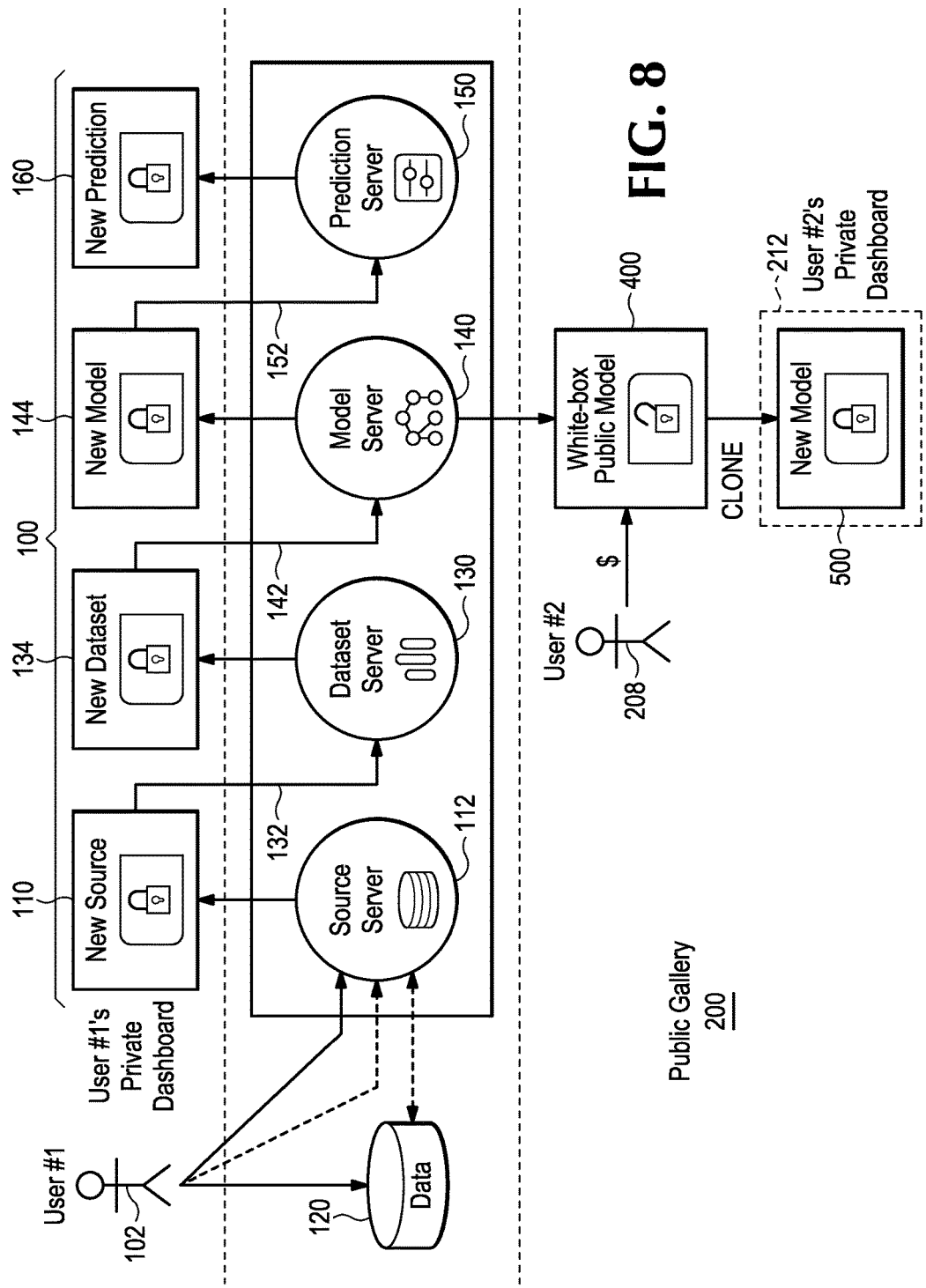
FIG. 8 shows the diagram of FIG. 7 amended to illustrate the second user purchasing access to the white-box public model, and showing the white-box model cloned and copied to the user #2 private dashboard.

FIG. 7 illustrates a case where a white box public model 400 has been published to the public gallery 200. Referring now to FIG. 8, it illustrates the user 208 paying consideration to purchase the white box public model 400. In that case, the model 400 is cloned and a new model 500 is formed in the user's private dashboard 212.

Figure 9:
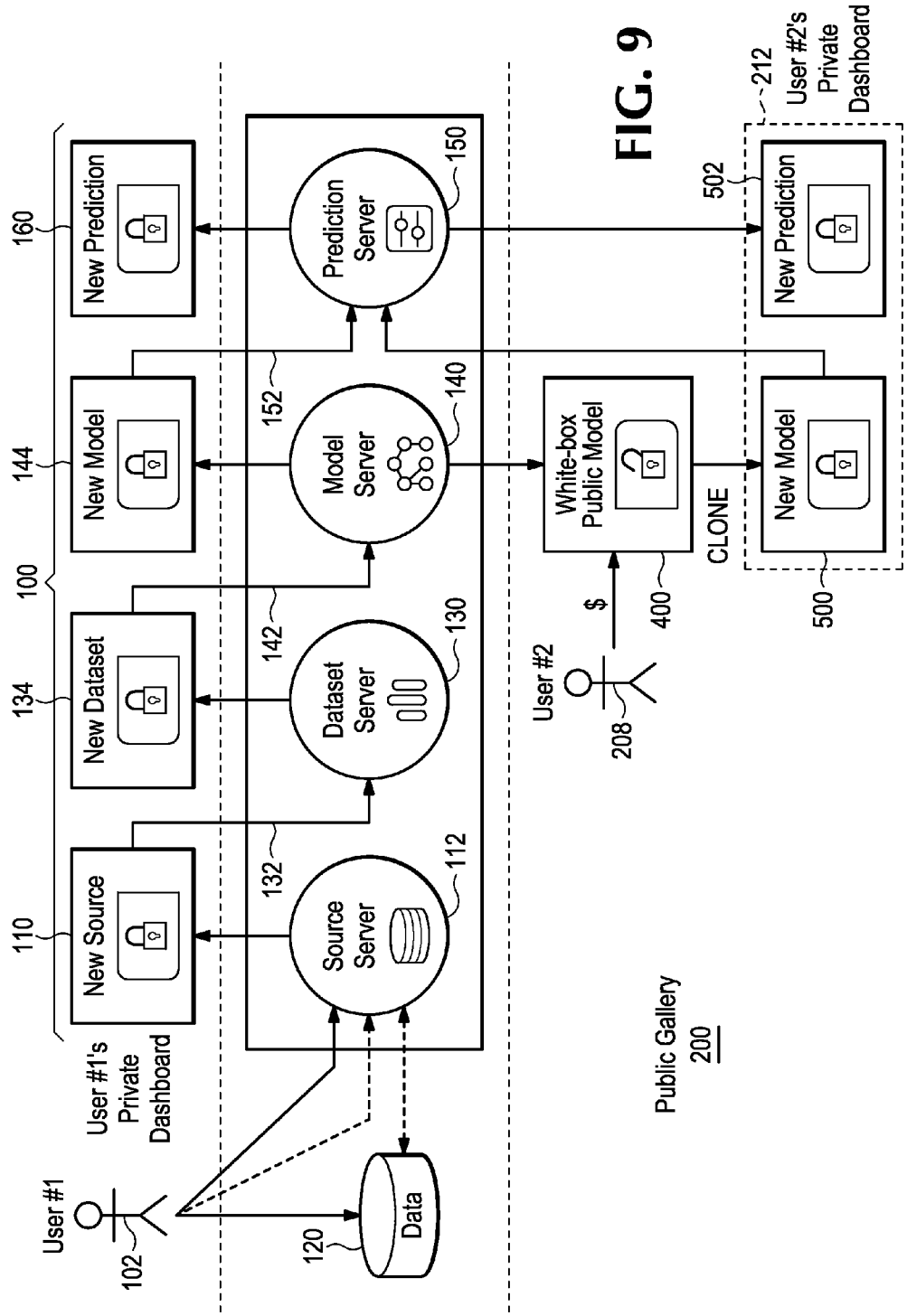
FIG. 9 shows the diagram of FIG. 8 amended to illustrate the second user utilizing the cloned model to make a new prediction in the user #2 private dashboard.

Turning now to FIG. 9, continuing the prior example, the user 208 can now use her new model 500 and create a new prediction by using the prediction server 150 to apply new input data (not shown) to the model 500. The resulting new prediction 502 is written to the user's private dashboard 212.

Once a user makes a data set or model public, the corresponding data set or model may be exposed in both an individual gallery or dashboard, and a public gallery, such as the public gallery 200. In the public gallery, data sets and models can be filtered by an interested user, according to variety of variables such as popularity, recency, white box, black-box, price and other attributes including but not limited to names, descriptions, tags, etc. In a preferred embodiment of the public gallery may be implemented on a webpage.

Figure 10:
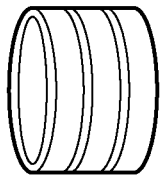
FIG. 10 shows an example of a source summary screen display.

FIG. 10 shows an example of a source summary screen display. For example, a display of this general type may be used in the context of a public gallery on a web site to describe a data source. In this case, the data relates to the iris flowers. The raw data comprises various instances of input fields (sepal length, sepal width, etc.) and a species objective or output field. Values for some instances may be displayed. The field types may be indicated as well (for example, "123" indicating a numeric type, "ABC" indicating a category type). The design of this display is merely illustrative; the layout is not critical.

Figure 11:
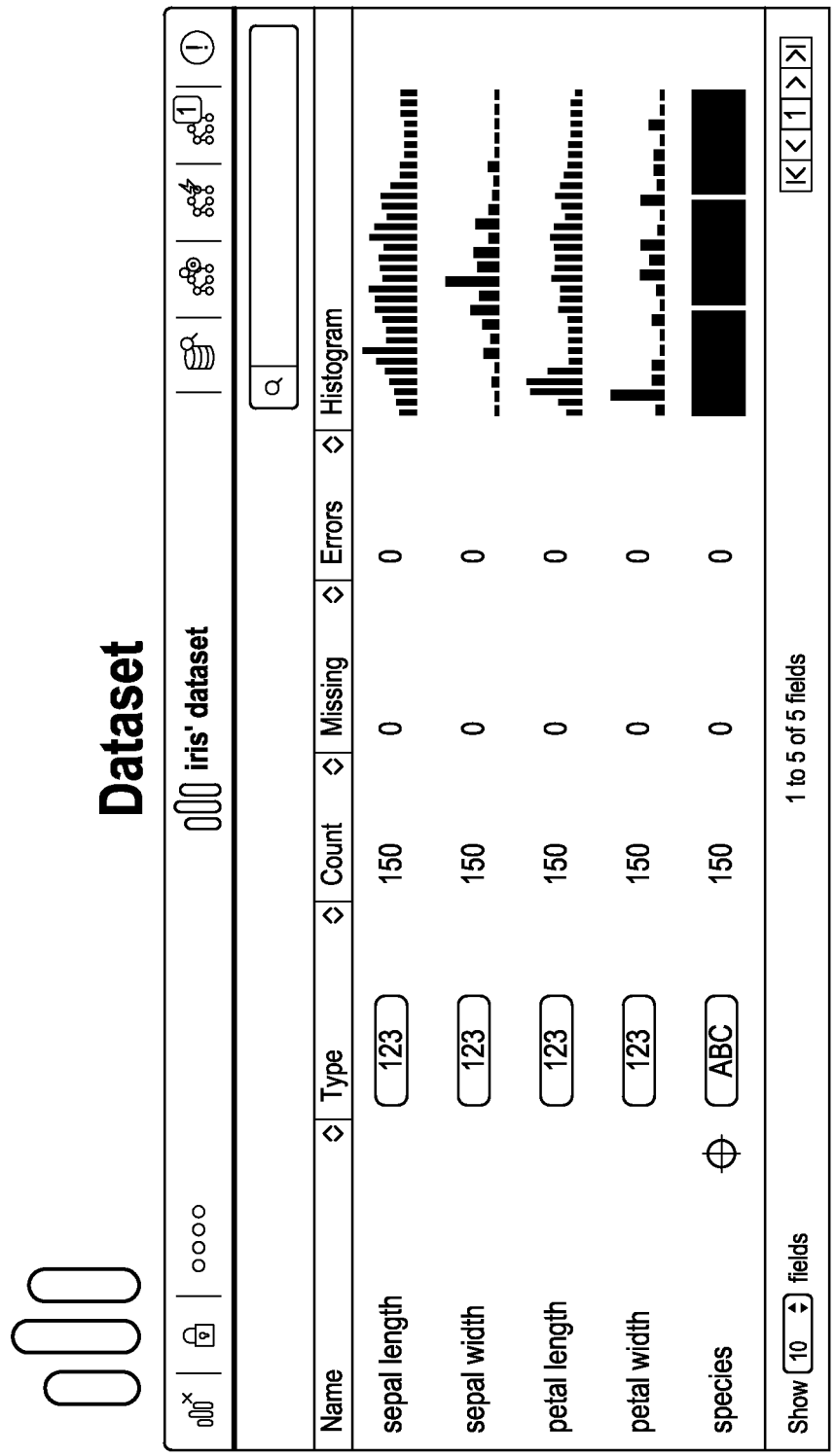
FIG. 11 shows an example of a dataset summary screen display.

FIG. 11 shows an example of a dataset summary screen display. In this example, the dataset is derived from the source of FIG. 10. A display of this type may include counts for each field, and a histogram of values for each field. A display of this type, for example, may be used in the context of a public gallery on a web site to describe a dataset. The design of this display is merely illustrative; the layout is not critical.

Figure 12:
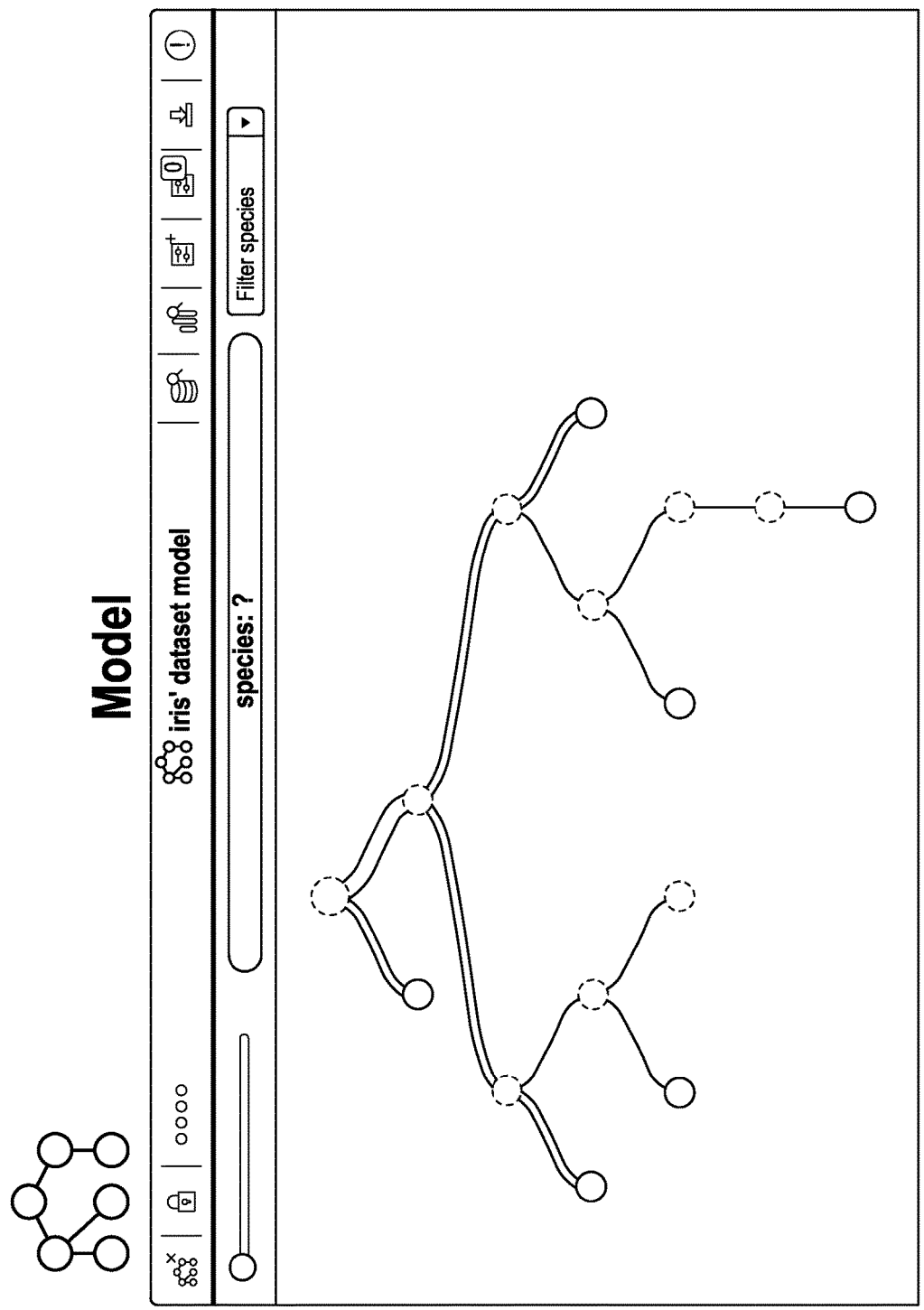
FIG. 12 shows an example of a graphical model screen display.

FIG. 12 shows an example of decision tree model visualization. This graphic illustrates a model of the dataset of FIG. 11. For example, branch line widths may be used to indicate number of instances of sample data. Each end leaf may correspond to a species of iris; the predictions based on the input variables indicated in the dataset. Other types of visualizations of models may be implemented.

Figure 13:
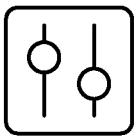
FIG. 13 shows an example of an interactive prediction user interface.

FIG. 13 shows an example of an interactive prediction user interface. In this illustration, sliders are used for a user to input values of the numeric variables, in order to predict a species of iris using the model of FIG. 12.

Figure 14:
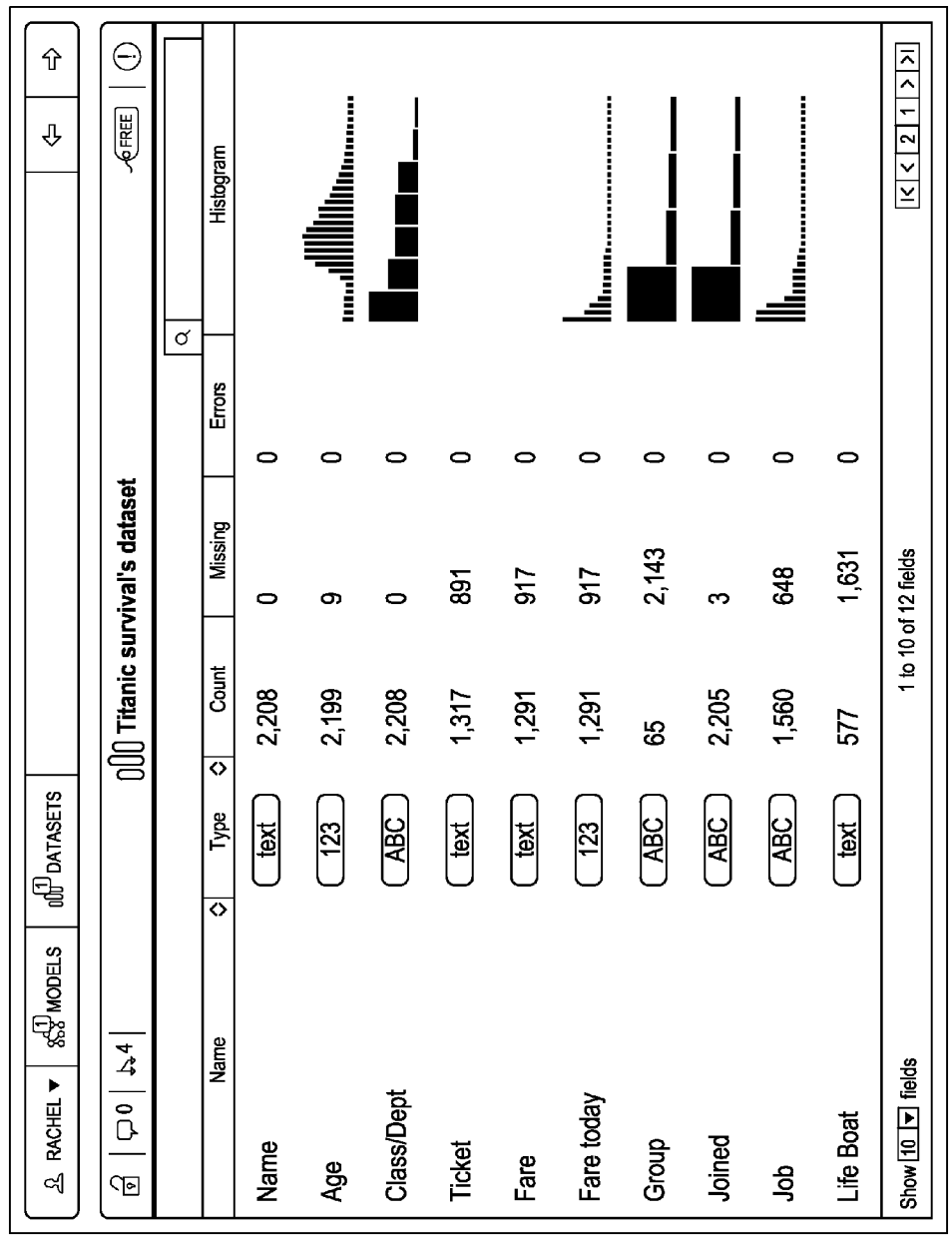
FIG. 14 shows a second example of a dataset summary screen display.

FIG. 14 is another example of a dataset summary screen display. In this case the dataset reflects survivors of the famous sinking of the RMS Titanic (1912). The field names include name, age, class/department, fare etc. The second column indicates the type of each field (for example, types of data may include text, numeric, binary, etc.). For each field, subsequent columns may indicate the respective count of items, number missing, and number of errors. These columns are merely illustrative and not critical. On the right, a histogram indicates the corresponding distribution of values for each field. For example, the first one is an age distribution. The next histogram suggests there were seven different classes of passengers.

A person of ordinary skill in the art will recognize that they may make many changes to the details of the above-described exemplary systems and methods without departing from the underlying principles. Only the following claims, therefore, define the scope of the exemplary systems and methods.

We claim:

1. A processor-implemented system comprising:
   (a) a source server for managing access to a data source;
   (b) a dataset server for creating and managing access to a dataset created from the data source;
   (c) a model server for creating and managing access to a model based on the dataset;
   (d) a prediction server for creating and managing access to a prediction that results from utilizing the model;
   (e) a user interface component that implements a corresponding private dashboard for each one of plural users of the system, wherein each private dashboard stores resources for the corresponding user without exposing the stored resources to any other user of the system; and
   (f) a public gallery component that, in cooperation with the user interface, implements a public gallery to enable a first user to selectively advertise a dataset for use by other users of the system to build a model of the dataset, wherein the public gallery component displays a summary of the advertised dataset;
   wherein the summary comprises a screen display including, for each field in the dataset, a field name and a histogram of data in the field; and
   wherein the public gallery component is configurable to advertise a model for use by other users of the system, by displaying a summary of the advertised model.

2. The system according to claim 1 wherein the system further enables the first user to selectively expose either a white-box public model or a black-box form of a model for use by other users of the system, and wherein the prediction server is configured to make predictions using the black-box form of the model.

3. The system according to claim 1 wherein the system is arranged to clone the dataset advertised in the public gallery to form a copy, and to store the cloned copy in a private dashboard associated with a second user, responsive to an indication of receipt of consideration from the second user.

4. The system according to claim 1 wherein the system further enables the first user to selectively expose a white-box form of a model for use by a second user of the system, wherein the white-box form enables use of the model to make predictions and also discloses a descriptive and actionable version of the model.

5. The system according to claim 4 wherein the system further enables the second user to provide its private dataset to the model server to create a new model accessible in the second user's private dashboard.

6. The system according to claim 5 wherein the system further enables the second user to utilize its new model to create a new prediction accessible in the second user's private dashboard.

7. The system according to claim 5 wherein the first user elects to charge for each new prediction made by the second user using the exposed model, and the system responsively requires receipt of consideration from the second user for each additional new prediction initiated by the second user.

8. The system of claim 4 wherein the black-box form enables use of the model to make predictions without disclosing its internal operation.

9. The system of claim 4 wherein at least one of the other users of the system is a processor configured to use the system via an application programming interface (API).

10. The system of claim 1 wherein the summary of the advertised dataset comprises metadata that describes the dataset.

11. The system of claim 1 wherein the summary comprises a screen display including, for each field in the dataset, a field name, corresponding type, and a count of records in the dataset that have data in the field.

12. A processor-implemented system comprising:
a dataset server for creating and managing access to a dataset wherein the dataset comprises a plurality of records, each record comprising a plurality of fields;
a model server for creating and managing access to a model based on the dataset, wherein the model is a structured representation of the dataset with predictive power;
a prediction server for creating a prediction from input data by utilizing the model;
a user interface component that implements a corresponding private dashboard for at least one of plural users of the system; and
a public gallery component that implements a public gallery that enables a first user to selectively advertise a dataset in the public gallery for use by other users of the system, wherein the public gallery component displays a summary of the advertised dataset;
wherein the summary of the dataset comprises a screen display including, for each field in the dataset, a field name and a histogram of data in the field; and
wherein the public gallery component further enables the first user to selectively advertise a model owned by the first user for potential use by other users of the system.

13. The system according to claim 12 wherein the system further enables the first user to offer access to the advertised dataset to a second user in exchange for a predetermined consideration.

14. The system according to claim 13 wherein the consideration is monetary.

15. The system according to claim 13 wherein the public gallery component enables the first user to selectively expose either a white-box model or a black-box model for potential use by other users of the system, wherein the black-box form of the model enables use of the model to make predictions without disclosing its internal operation.

16. The system according to claim 12 wherein the system is arranged to clone the dataset advertised in the public gallery to form a copy, and to provide the cloned copy as a private dataset for use by a second user, responsive to an indication of receipt of consideration from the second user.

17. The system of claim 12 wherein the summary of the advertised dataset comprises metadata that describes the dataset.

18. The system of claim 12 wherein the summary comprises a screen display including, for each field in the dataset, a field name, corresponding type, and a count of records in the dataset that have data in the field.

19. The system of claim 12 wherein the public gallery component is configurable to display at least one of a thumbnail picture representation of the model or a number of instances in a dataset used to build the model.

20. A non-transitory, machine readable storage medium having stored thereon a series of instructions for causing one or more processors to perform operations comprising:
accessing a data source to acquire raw data comprising a plurality of records of plural fields;
processing the acquired raw data to form a corresponding dataset;
responsive to input from a first user who owns the dataset, publishing the dataset to a public gallery; wherein publishing the dataset comprises a screen display including, for each field in the dataset, a field name and a histogram of data in the field;
collecting a fee from a second user to utilize the published dataset;
paying substantially the collected fee to the first user;
cloning the dataset to form a copy; and
providing the copy for exclusive use by the second user;
creating a model of a dataset;
responsive to input from a first user who owns the model, publishing a black-box version of the model to a public gallery, the black-box version enabling use of the model by a second user to make predictions.

21. The non-transitory, machine readable storage medium according to claim 20, the stored instructions further causing the one or more processors to perform operations comprising:
collecting a fee from a second user to utilize the published model to make a new prediction without accessing the internal workings of the model.

22. The non-transitory, machine readable storage medium according to claim 21, the stored instructions further causing the one or more processors to perform operations comprising:
receiving a second dataset from a second user;
conditioned on receiving the said fee, responsive to an input request, cloning the published model from the public gallery to the second user's private dashboard;
inputting the second dataset to the cloned model to form a new prediction; and
delivering the new prediction to the second user's private dashboard without disclosing internal details of the cloned model; and
crediting at least a part of the fee to the first user.

23. A computer-implemented method comprising:
storing a prediction model in a private workspace associated with a first user of a computing system, so that the prediction model is not visible to any other user of the system;
responsive to an input from the first user, displaying a summary of the prediction model to other users of the system in a public gallery
wherein the summary includes a tree visualization of the prediction model and metadata describing a dataset underlying the prediction model;
receiving input data from a second user of the system;
applying the prediction model to the received input data to form a prediction result; and
providing the prediction result to the second user without disclosing the prediction model.

24. The method of claim 23 wherein applying the prediction model to the received input data is predicated upon receiving a second input from the first user permitting use of the prediction model by the second user.

25. The method of claim 23 including:
in the public gallery, filtering published models to support selection responsive to user input based on one or more variables comprising popularity, recency, white box, black-box, price and or other attributes including names, descriptions, and tags.

26. The method of claim 23 including:

in the public gallery, filtering published datasets to support selection responsive to user input based on one or more variables comprising popularity, recency, number of instances, price and or other attributes including names, descriptions, and tags.

\* \* \* \* \*